(No Model.)

W. G. BEEK.
EYEGLASSES OR SPECTACLES.

No. 527,652.  Patented Oct. 16, 1894.

WITNESSES
A. E. Paige
F. Norman Dixon

Wm. G. Beek,
INVENTOR
By his Attorneys,
Wm C. Strawbridge
Bonsall Taylor

UNITED STATES PATENT OFFICE.

WILLIAM G. BEEK, OF CHICAGO, ILLINOIS, ASSIGNOR TO THE E. KIRSTEIN'S SONS COMPANY, OF ROCHESTER, NEW YORK.

EYEGLASSES OR SPECTACLES.

SPECIFICATION forming part of Letters Patent No. 527,652, dated October 16, 1894.

Application filed October 13, 1893. Serial No. 488,019. (No model.)

*To all whom it may concern:*

Be it known that I, WILLIAM G. BEEK, a citizen of the United States, residing at Chicago, in the State of Illinois, have invented an Improvement in Eyeglasses or Spectacles, of which the following is a specification.

My invention relates to bridge springs employed upon eyeglasses and spectacles and especially to the class of bridge springs known as bar springs, in which the extremital portions or side pieces of the structure are connected in such manner as to have a horizontal sliding movement toward and from each other, and which are constantly pressed toward each other, or in other words given a contractile tendency, by a spiral or other spring mounted upon the structure at such point as convenience of manufacture or the requirements of the art may dictate.

In the use of eyeglasses which are retained in place upon the nose of the wearer by the clasping action due to the contractile tendency of the bridge spring it has been found that the clasp of the nose pieces is in some cases stronger than is necessary to hold the glasses in place and such as to be uncomfortable to the wearer.

It is the object of my invention to provide a bridge spring with means by which the extent of its closing action and therefore the degree of pressure of its clasp upon the nose of the wearer may be limited at any selected point.

Figure 1:
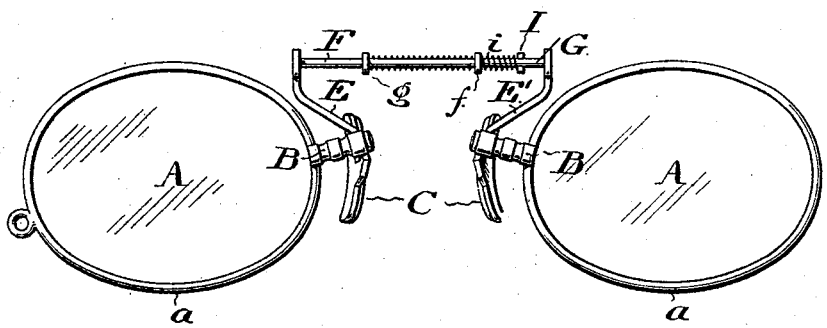
Figure 2:
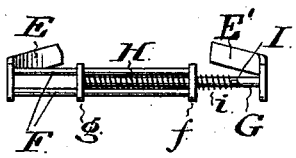

In the accompanying drawings, Figure 1 is a view in front elevation of a pair of eye glasses equipped with a good form of my invention. Fig. 2 is a top plan view of the bridge spring of Fig. 1.

In the accompanying drawings, A A are the lenses; $a$, the lens rims; B, the clamp posts; C, the nose pieces, and E E' the side bars of the bridge springs of glasses in connection with which an embodiment of my invention is illustrated as employed.

F F are a pair of slide pins horizontally projecting, in parallelism, from the side bar E, and the free extremities of which are equipped with a yoke $f$.

G is a slide pin horizontally projecting from the side bar E', passing through the yoke $f$, so that its outer portion exists between the pins F F, and equipped at its free extremity with a yoke $g$ which embraces the slide pins F F.

H is a spiral spring mounted upon the slide pin G, and bearing as to its respective extremities respectively against the yokes $f$ and $g$, the action of which spring is to force the yokes $f$ and $g$ away from each other and consequently to draw the lenses and nose pieces toward each other.

The construction of the bridge spring so far described is well known in the art, and constitutes a form which I have selected as an appropriate one in connection with which to illustrate a typical embodiment of my invention.

Normally the action of the spring H is such as to force the yokes $f$ and $g$ away from each other and into contact with the side bars E' E, and therefore to force the nose pieces toward and almost into contact with each other.

In order to limit the approach of the lenses, I provide means to limit the closing action of the bridge spring, such means consisting of a stop, I, fixedly mounted upon one of the slide pins,—in Figs. 1 and 2 said stop being shown as consisting of a stud fixedly secured to the slide pin G. This stop will, as will be understood, when mounted upon the slide pin G, be encountered (either directly or through the intervention of the cushion spring, whereof hereinafter) by, and serve to stop the yoke $f$ as the latter is, by the spiral spring H, forced away from the yoke $g$ and, in thus limiting the separation of the yokes, will limit the approach of the nose pieces through which the bridge spring clasps the nose of the wearer.

The place of application of the stop I, shown in the drawings, is not of the essence of the invention, inasmuch as said stop would be equally efficient when mounted upon either of the pins F F in lieu of upon the pin G.

In practice, an optician fitting upon a wearer an eye glass provided with a bridge spring equipped with my improved permanent stop, will mount or secure the stop in position upon the bridge spring at the appropriate point to effect the desired result,—one especial advantage of the fixed stop herein described being that when thus secured by the optician said stop will remain in place and is not subject to such accidental or other displacement or derangement as would impair the proper set of the glasses.

In order to ease the abrupt shock which would otherwise take place in the contact between the yokes and the stop,—as well, also, as to allow of there being some slight play of the members of the bridge spring when the latter is closed to about the limit of its movement,—I provide a cushioning spring $i$, being a small spiral spring, and mount the same upon the slide pin upon which the stop is mounted and in place between said stop and the adjacent yoke which is adapted to encounter it in the closing action of the bridge spring.

It is of course to be understood that the cushioning spring which forms the subject of my present invention, may be applied upon bridge springs of various constructions, that it may be employed in connection with any preferred type of stop, whether fixed or adjustable, and that in fact a stop as such may in some instances be dispensed with and the cushioning spring be so situated upon the bridge spring as under the compression exerted upon it in the closing of the bridge spring, to bear against one of the side bars, for example, instead of against a stop.

Having thus described my invention, I claim—

1. In combination with a slide-pin bridge spring, a stop adapted to limit the closing movement of said bridge spring, and a cushioning spring mounted in connection with said stop, substantially as set forth.

2. In combination, side bars, slide pins, a spring adapted to draw said side bars together, and a cushioning spring which is compressed in the closing of the bridge spring, substantially as set forth.

3. In combination with a slide pin bridge spring, as a means to limit its closing action, a stop mounted upon one of the members and adapted to be encountered, through a cushioning spring, by another of the members in the closing movement of the bridge spring, substantially as set forth.

4. In combination with a slide-pin bridge spring, a cushioning spring which is compressed in the closing movement of said bridge spring, substantially as set forth.

5. In combination, side bars, slide pins, means for drawing said side bars together, a stop for limiting the approach of said side bars, and a cushioning spring which is compressed in the closing of the bridge spring, substantially as set forth.

6. In a bridge spring, in combination, side bars, slide pins, yokes, a spring for occasioning the approach of said side bars, a stop to limit the approach of said side bars, and a cushioning spring, substantially as set forth.

In testimony that I claim the foregoing as my invention I have hereunto signed my name this 27th day of September, A. D. 1893.

WILLIAM G. BEEK.

In presence of—
JOHN J. LYNCH,
ARTHUR A. BLISS.